United States Patent [19]
Trebbi

[11] Patent Number: 5,762,978
[45] Date of Patent: Jun. 9, 1998

[54] BATCHING DEVICE FOR TABLETS MAKING COMPRESSION MACHINE

[75] Inventor: Roberto Trebbi, S.Lazzaro Di Savena, Italy

[73] Assignee: I.M.A. Industria Macchine Automatiche S.p.A., Ozzano Emilia, Italy

[21] Appl. No.: 776,363

[22] PCT Filed: Jul. 31, 1995

[86] PCT No.: PCT/IT95/00133

§ 371 Date: Jan. 29, 1997

§ 102(e) Date: Jan. 29, 1997

[87] PCT Pub. No.: WO96/04127

PCT Pub. Date: Feb. 15, 1996

[30] Foreign Application Priority Data

Aug. 5, 1994 [IT] Italy ............... BO94A0384

[51] Int. Cl.$^6$ ............................................. B30B 11/08
[52] U.S. Cl. ................ 425/345; 425/353; 425/DIG. 5
[58] Field of Search ........................ 425/345, 353, 425/447, DIG. 5

[56] References Cited

U.S. PATENT DOCUMENTS

| 2,260,456 | 10/1941 | Johnson. | |
|---|---|---|---|
| 3,384,035 | 5/1968 | Gabriel et al. | 425/345 |
| 3,677,673 | 7/1972 | Shapiro | 425/345 |
| 4,057,381 | 11/1977 | Korsch | 425/345 |
| 4,943,227 | 7/1990 | Facchini. | |
| 5,350,548 | 9/1994 | Hinzpeter et al. | 425/345 |

FOREIGN PATENT DOCUMENTS

| 945184 | 4/1949 | France. |
| 1135114 | 11/1968 | United Kingdom. |
| WO 95/15846 | 6/1995 | WIPO. |

*Primary Examiner*—James P. Mackey
*Attorney, Agent, or Firm*—McAulay Fisher Nissen Goldberg & Kiel, LLP

[57] ABSTRACT

The device can be applied to compression machines including a turret (1), rotating around a vertical axis and fitted with a series of die holes (3) aimed at being filled with powder of granular material; pairs of punches (5,6), upper and lower punches respectively, related to each die hole (3) and guided slidably in the turret (1), engage the die holes (3) with respective counterfacing working heads (5a,6a). The device features a driving cam (9) that drives at least one of the punches (5,6) and determines the reciprocal distance between the working heads (5a,6a) of each pair of punches, in the material batching step and in the material loading step; the driving cam (9) moves axially with respect to the turret (1) so as to adjust this distance. Further cams (11,12) are provided for completion of guiding structure (15) with variable profile, which facilitates entering in the driving cam (9). The cams (11,12) are mechanically linked to each other, so as to change the profile in accordance with adjusting position of the driving cam (9).

11 Claims, 5 Drawing Sheets

BATCHING DEVICE FOR TABLETS MAKING COMPRESSION MACHINE

TECHNICAL FIELD

The invention relates to a compression machine for making tablets.

BACKGROUND ART

Known compression machines for making tablets consist of a turret, that is driven so that it rotates around its vertical axis, and that is fitted with a die hole or matrix plate located near its mid-height coaxially therewith.

The die holes made in this plate consist of holes with their axes regularly spaced apart along a circumference coaxial with the turret, and are parallel to the axis of the turret.

Each die hole has two related punches, upper and lower, guided by respective housings in the turret. The housings and the respective die hole are coaxial.

The working heads of each pair of punches faces each other and have such a diameter that they fit, from above and below, into the related die hole.

As it is known, production of a tablet by means of a compression machine involves, in sequence, loading a die hole with powder or granular material, volumetric determination of the amount of material put into the die hole to form the tablet, pre-compression of the tablet material and subsequent final compression of the same, with consequent forming of a tablet of a pre-established thickness. Finally the tablet thus formed is ejected from the die hole.

The steps just described are performed, in sequence, while each die hole travels along a predetermined arc of a round. Usually this arc extends along a full round made by the turret.

In particular, suitable driving means, connected with the punches and designed to impart guided axial stokes to the punches in their housings, work in correspondence with the filling, batching and ejecting stations.

A compressing machine for making tablets of the above described type is disclosed in the U.S. Pat. No. 4,943,227, owned by the same Applicant.

This machine comprises a cylindrical chamber, made in the turret and coaxial with the turret axis, set into communication with the die holes by means of infeed channels, which are made in the die hole plate and preferably arranged radially with respect to the axis of the turret.

The cylindrical chamber is filled with the material to be supplied to the die holes in order to make the tablets.

The die holes are loaded rapidly due to the centrifugal force resulting from rotation of the turret.

In practice, as soon as the working head of the upper punch uncovers the opening section of the infeed channel, the material is pushed inside the die hole.

The distance between the opposing working heads of the punches determines, in a loading stage, the die hole volume, i.e. the volumetric determination of the tablet being formed.

The punches are moved by driving means comprising fixed cam grooves, integral with the machine structure and designed to be engaged by rollers which are rotatably supported by the same punches on a radial axis.

In the known compressing machines for making tablets, it is difficult to change, according to the needs, the batch of material fed for making a single tablet.

It is necessary to act on the lower punch driving in order to change the distance between the working heads of the punches, and this operation requires the substitution of the whole group that drives the punches in the loading and batching steps after the ready tablets have been ejected.

Obviously, this results in high construction and operation costs as well as in a limited through-put.

An improved compression machine for making tablets is disclosed in the Italian Patent Application No. BO93A000493, owned by the same Applicant.

This machine includes punches that carry pairs of rotating rollers, fastened to the opposite ends of a cross pin, and engaging respective cam grooves made in the fixed structure of the machine.

The aforementioned rollers can fit into the cam grooves either at the level of the lower wall or at the level of the upper wall of the path defined by the cam groove.

DISCLOSURE OF THE INVENTION

An object of the present invention is to provide a device that allows for a simple and quick adjustment operation of the batching means in compression machines for making tablets, all this being obtained by a functional and reliable technical solution.

The above mentioned object is obtained in accordance with the invention, by means of a batching device for a tablet making compression machine including: a rotary turret driven into rotation around a vertical axis; a series of die holes, spaced apart along the periphery of the said turret, the said die holes being fed with material in powder or granular form; a respective pair of upper and lower punches for each die hole, the said punches featuring counterfacing respective working heads and being smoothly guided in the turret so that the said working heads engage the die holes; driving means, connected with the punches for adjusting the mutual distance between the said working heads; driving cam means for at least one of the said punches for defining the mutual distance between the said working heads during material batching and filling steps, said driving cam means being movable axially with respect to the turret to adjust the said distance; further driving means, formed by filling operation cams which cooperate with each other to define linking path means having a variable profile and leading to the said driving cam means, said filling operation cams being mechanically linked to each other so as to change the profile of the said linking path means in accordance with the adjustment position of the driving cam means.

BRIEF DESCRIPTION OF THE DRAWINGS

The characteristic features of the present invention are pointed out in the following description with particular reference to the enclosed drawings, in which.

BEST MODE OF CARRYING OUT THE INVENTION

Figure 1:
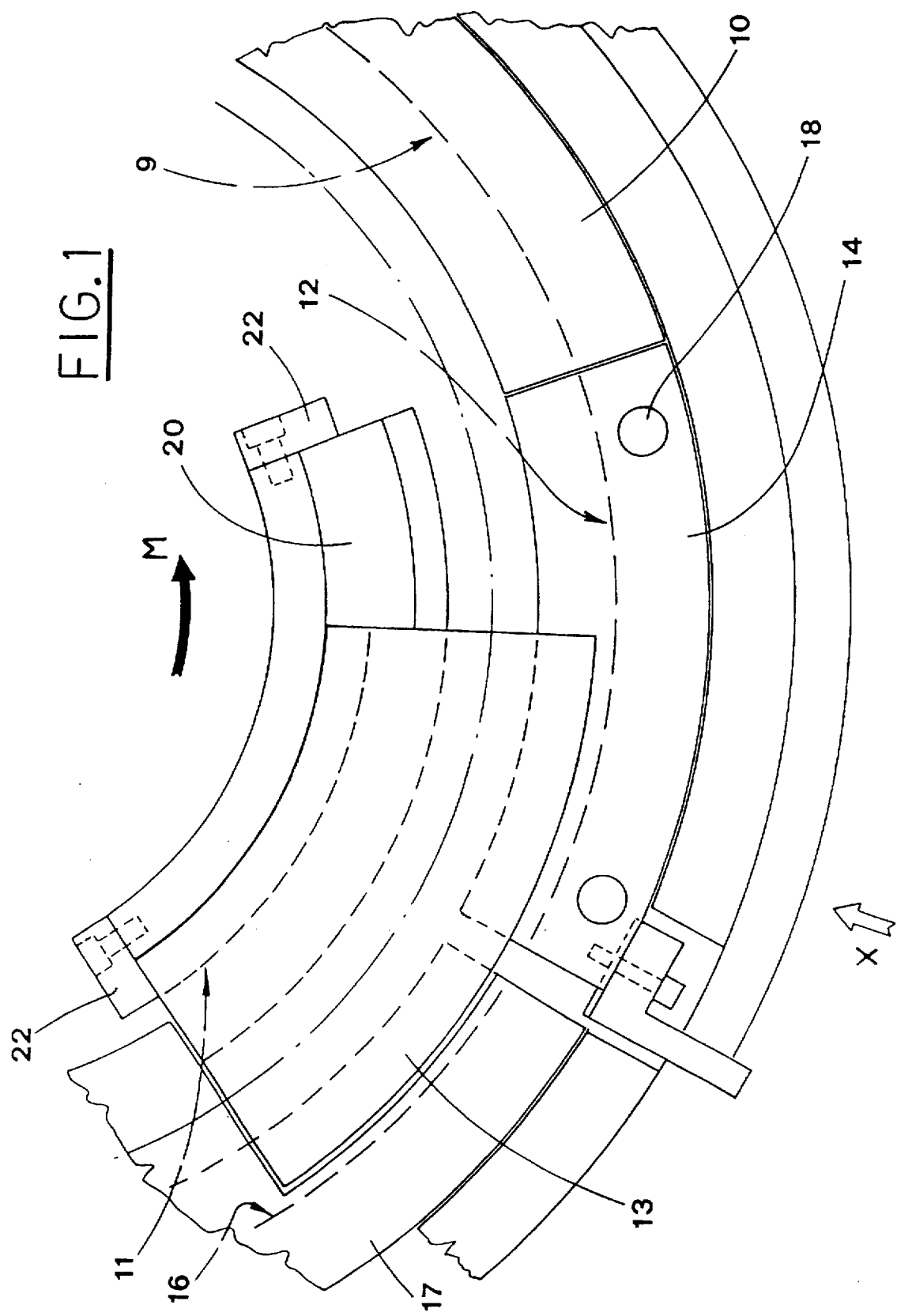
FIG. 1 is a plan view of the dosing device being the subject of the present invention.

With reference to the drawings, a rotary turret 1 of a compression machine is driven to rotate in the direction M around a vertical axis; the turret 1 is fitted, in a known way, with a die hole plate 2, coaxial thereto.

The die holes 3 in the die hole plate 2 have their axes parallel to the axis of the turret 1, and are arranged along a circumference coaxial with the turret regularly spaced apart from one another.

The die holes 3 consist of through holes formed in tubular elements 4 connected to the plate 2.

For each die hole 3 there are respective lower and upper punches 5, 6 guided in corresponding housings in the turret below and above the die hole 3 and coaxial with the die hole.

The punches of each pair are equipped with respective working heads 5a, 6a that face each other and are not bigger in the diameter than the die holes so that they fit into respective die holes 3.

Moreover, the die holes 3 communicate with channels feeding the material to be compressed, supplied in powder or granular form.

The infeed channels are arranged radially with respect to the turret 1 axis and leads to upper parts 3a of the die holes, that has the diameter partially widened.

The punches 5, 6 are integral with respective pins 7 that diametrally cross the respective punches.

Pairs of rollers 8 are rotatably carried by the pins 7, so that they are mounted on opposite ends of the pins.

Only the rollers 8 of the upper punches 5 are shown in figures. These rollers run in respective driving cam grooves made in the fixed structure of the machine.

These grooves act as driving guides for at least an angular portion of the circular path followed by the turret 1, so as to provoke guided axial strokes for the punches 5,6 and define the mutual distance between the working heads 5a, 6a of each pair of punches.

More precisely, the batching device, being the subject of the present invention, features a batching adjustment and a driving cam 9, made in the internal wall of a section of a drum 10 fastened to the fixed structure of the machine.

The driving cam 9 can be moved vertically so as to adjust the distance between the working heads of the punches 5, 6 in relation with the type of tablets to be made.

The lower wall of the inlet section of the cam 9 is horizontal, whereas the upper wall is inclined downwards, with respect to the translation direction of the roller 8.

The roller 8 can fit into the cam 9, also when it is in a vertical position, on a level that varies from a minimum, at the level of the lower wall, to a maximum, at the level of the upper wall.

Thus the punch is made to perform an additional travel with respect to the one defined by the cam 9 position, so as to increase the introduction of the material into the die hole 3.

Figure 3:
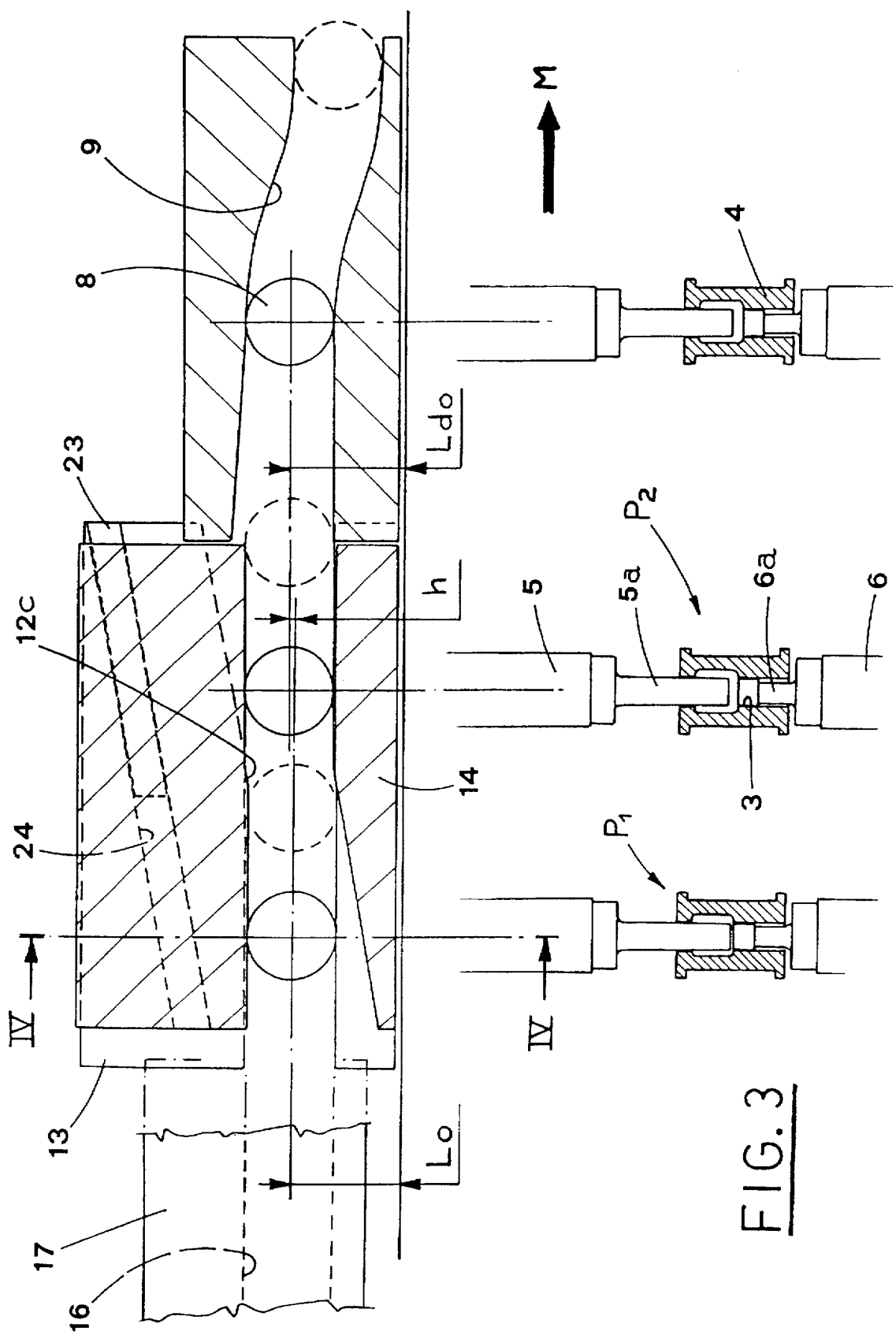
FIG. 3 shows the same working steps, in a different batching adjustment position.

Obviously, if the additional travel is not implemented, the roller 8 fits into the driving cam 9 at the level of the lower wall, i.e. determining the minimum level, as seen in FIG. 3.

Upstream of the cam 9, following rotation direction M, there are a first and a second filling operation cams 11 and 12, inner and outer respectively, formed by corresponding sections of the drum 13, 14, locked to the fixed structure of the machine.

The rollers 8, respectively inner and outer, of the punch 5, run in the cams 11, 12. The combined positioning of the cams 11 and 12 define a channel path 15 having a changeable profile, that links a pre-loading cam 16 with the cam 9. The pre-loading cam 16 is made in a drum 17, firmly fastened to the machine.

The outer displacement filling cam 12 is guided slidably in vertical direction along a pair of stems 18 carried by a frame 19 fastened to the fixed structure of the machine.

A first section 12a of the lower wall of the displacement cam 12 is inclined upwards and a second section 12b of the same wall is horizontal and straight. Two sections of the upper wall of the displacement cam 12 are instead horizontal and straight, but vertically staggered and linked by a section 12c inclined upwards following the direction of the translation of the roller 8.

The inclined section 12c determines a minimum difference of level h, imposed to the axial translation of the punch.

A pair of guides 20 and 21, lower and upper respectively, fastened to the fixed structure of the machine, make the inner filling cam 11 slide angularly on a circular path concentric with the turret 1. Suitable stops 22 limit the displacement of the cam 11.

A first section 11a of the upper wall of the cam 11 is horizontal and straight, while a second section 11b of the same wall is inclined upwards.

Two sections of the lower wall of the cam 11 are instead horizontal and straight, but vertically staggered and linked by an inclined section 11c, so as to define the minimum level difference h.

The cams 11 and 12 are mechanically locked by means of a tooth 23, inclined upwards, fastened to the front part of the drum 13 and extending longitudinally with respect to the drum 13.

The tooth 23 runs in an upwardly inclined groove made in the surface of the drum 14 which faces the cams and is also inclined upwards.

Therefore, the angular movement of the filling operation cam 11 determines, by means of the inclined plane of the tooth 23, a vertical displacement of the cam 12.

Operation of the device will now be described, beginning from the step following the ejection of a tablet from the die hole 3 in which it has been formed.

Figure 2:
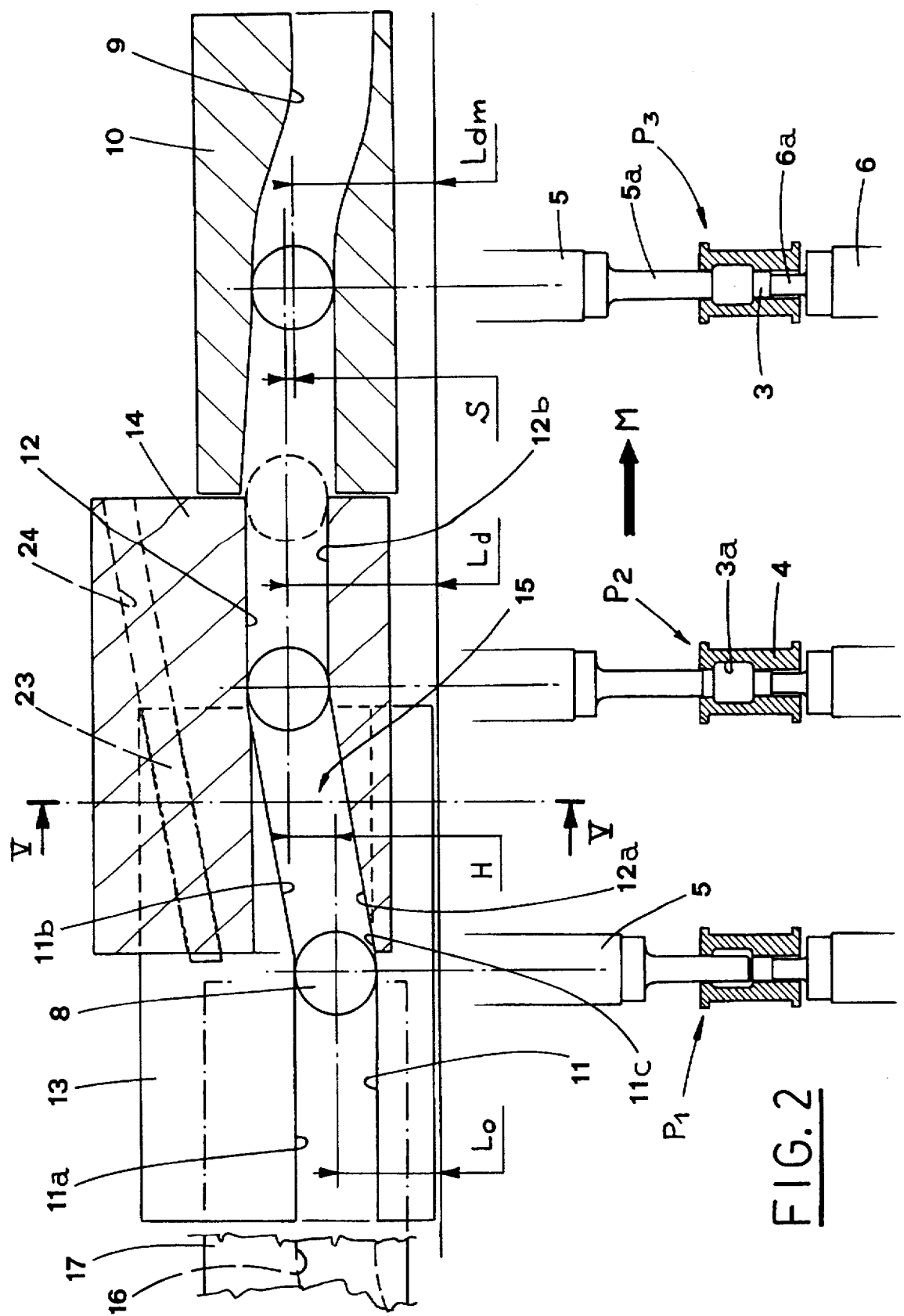
FIG. 2 shows schematically the working steps of the device as seen according to the direction X of FIG. 1 developed on a plane.

In this step, the outer roller 8 of the upper punch 5 engages the pre-loading cam 16 that brings the same punch to a fixed reference height, indicated with Lo in FIG. 2, with reference to the axial position of the rollers 8.

The heads 5a, 6a of the punches assume a position P1, in which the upper part 3a of the die hole 3 is closed off by the head 5a of the upper punch 5.

The punch 5 must be lifted to the level Ld, in which it engages the cam 9.

The level Ld changes in relation with the cam position adjustment and with the filling to be performed (see again FIG. 2).

The punch 5 is lifted by the filling operation cams 11, 12, the combined positioning of which defines the shape of the channel path 15.

Angular movement of the inner cam 11 determines a corresponding vertical displacement of the outer displacement cam 12, since the two cams are mechanically connected by means of the tooth 23 that engages the inclined plane defined by the groove 24.

When the inner cam 11 moves away from the angular position of the outer cam 12, the latter raises gradually and consequently, the time during which the inclined section 12a due to the increased level difference.

On the contrary, when the inner cam 11 moves towards the angular position of the outer cam 12, the difference of level diminishes.

Figure 4:
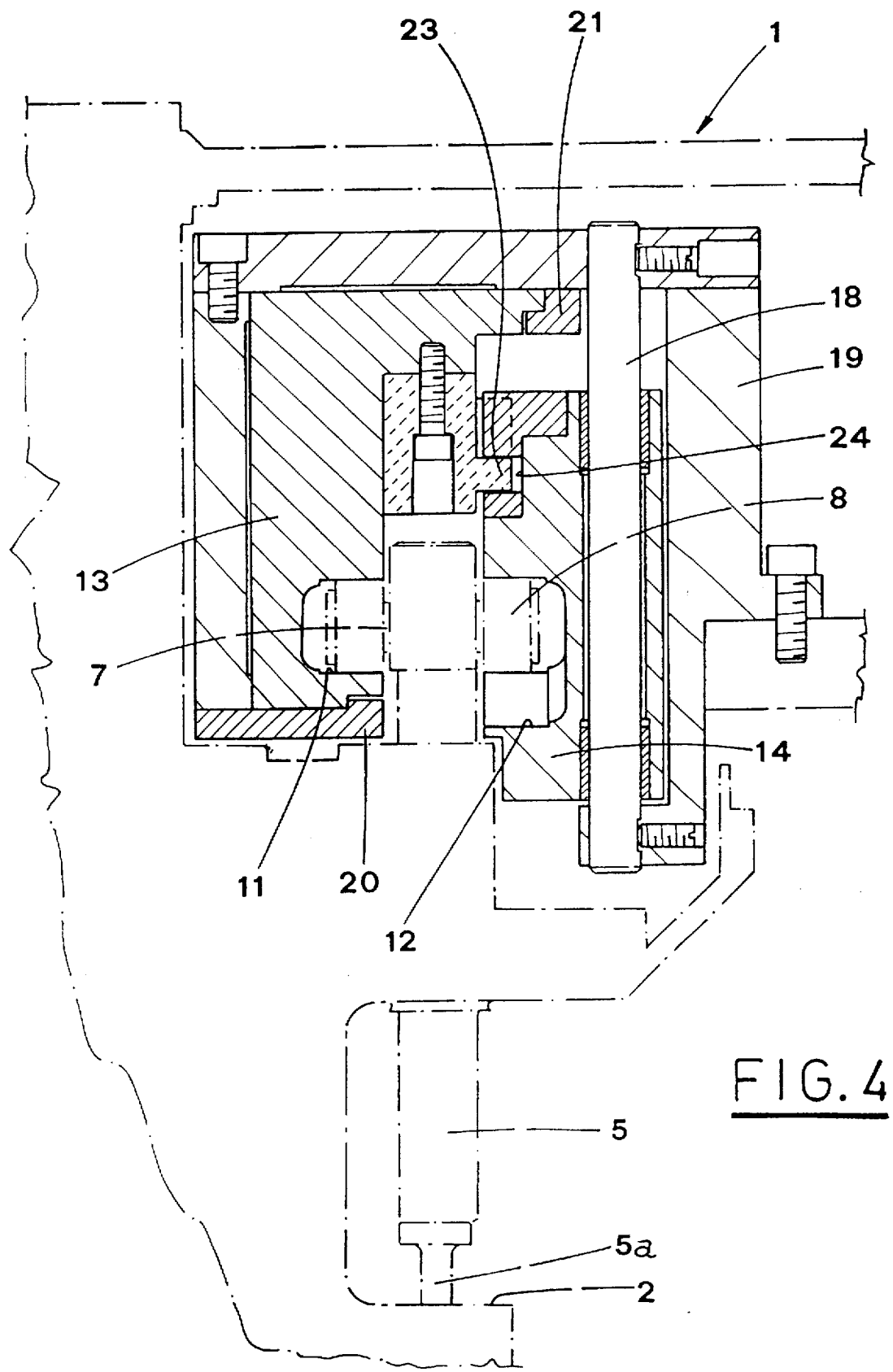
FIG. 4 shows a view on the section plane IV—IV of FIG. 3.
Figure 5:
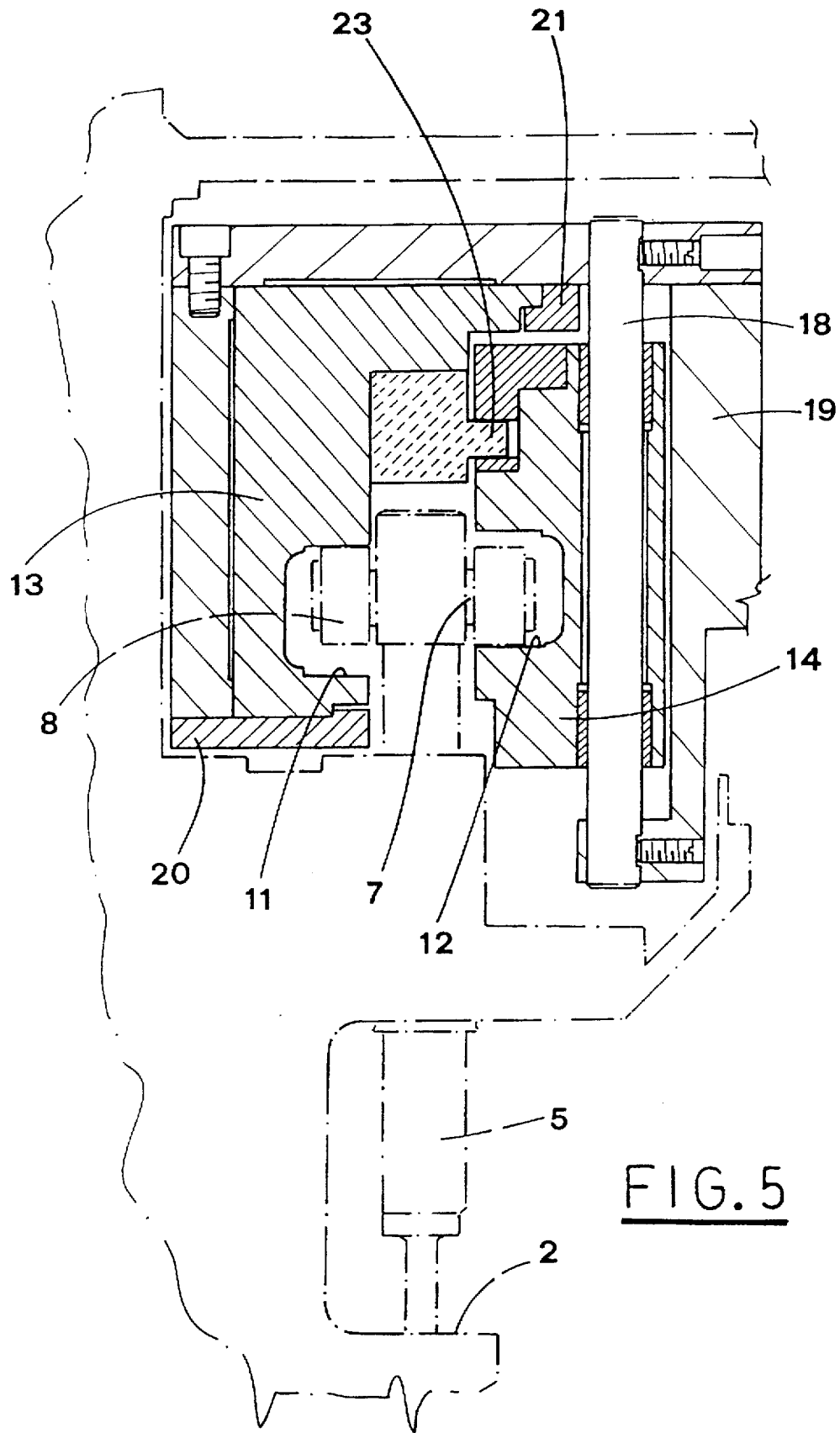
FIG. 5 shows a view on the section plane V—V of FIG. 2.

It is to be pointed out that combinatory use of the cams 11 and 12 is permitted due to the fact that the punch 5 features a pair of coaxial rollers 8 that engage respectively the said cams (see particularly FIGS. 4 and 5).

When the upper punch 5 is lifted, the upper portion 3a of the die hole 3 is opened so as to allow the same die hole to be fed with the material, as illustrated by the position P2 of the punch heads 5a, 6a.

A vertical displacement of the cam 9 permits adjustment of the distance between the working heads 5a, 6a during the die hole filling step in relation with the characteristics of the tablet to be formed.

In particular, when the cam 9 is in the position in which the stroke of the punches is set at the minimum, shown in FIG. 3, the roller 8 must be moved over the minimum level h in order to pass from the reference level Lo to the level Ldo on which it can enter the driving cam 9 at the level of the lower wall.

Therefore, in this case no additional displacement of the upper punches 5 is occurs during its regular stroke.

When the cam 9 is in the punches maximum stroke position Ldm, as shown in FIG. 2, movement of the punches is correspondingly increased. Moreover, in the case described herein, a level increase s has been imposed to the roller 8, so that the upper punch 5 performs an additional displacement.

This results in the roller 8 going over level H, in order to pass from the reference level Lo to the level Ld on which the roller can enter the cam 9 in a position intermediate between the lower wall and the upper wall of the driving cam 9.

After having entered the cam 9, the roller 8 comes into engagement with the inclined upper wall of the cam and consequently, returns to the aforementioned level Ldm.

Therefore, the filling operation cams 11, 12 must allow for the roller 8 going over the maximum level H or the minimum level h. The outer roller 8 can enter the driving cam 9 in any position intermediate between the ones at the level of the lower wall or at the level of the upper wall of the path defined by the same cam 9.

As has already been said, this allows the punch to perform an additional displacement s that Mums up with the displacement of the cam 9, so as to increase feeding of material to the die hole 3.

When the roller runs along the driving cam 9, a first lowering of the upper punch 5 occurs, as shown by position P3 of the heads 5a, 6a in FIG. 2.

During adjustment operation, the vertical position of the driving cam 9 is changed in accordance with the characteristics of the tablets to be formed.

Therefore, a possible additional displacement for the upper punch 5 is defined. The sum of two values defined in this way, determines the difference of level to be overcome by the filling operation cams 11, 12. This difference is established by suitable changing of the mutual positions of the cams 11, 12.

Obviously, in the loading or filling step, the distance established between the working heads of the punches defines the die hole volume, i.e. volumetric batch of the tablet being formed.

Therefore, the device allows for a simple and rapid material batching adjustment in compression machines for making tablets. This is obtained by a functional and reliable technical solution.

It is understood that what above has been described as a mere, not limitative example, therefore all possible constructive variants are protected by the present technical solution, as described above and claimed in the following.

I claim:

1. In a batching device for a tablet making compression machine including:

a rotary turret (1) driven into rotation around a vertical axis, said rotary turret having a periphery;

a series of die holes (3), spaced apart along said periphery of said turret, said series of die holes being fed with material in powder or granular form;

a respective pair of upper and lower punches (5,6) for each said die hole (3), each said punches having counterfacing respective working heads (5a,6a) and being smoothly guided in said turret (1) so that said working heads (5a,6b) engage said die holes (3), said working heads having a mutual distance therebetween;

driving means, connected with said punches (5,6) for adjusting said mutual distance between said working heads (5a,6a);

said driving means including:

a driving cam (9) for at least one of said punches (5,6) for defining said mutual distance between said working heads (5a,6a) during material batching and filling steps, said driving cam (9) being movable axially with respect to said turret (1) to adjust said mutual distance; and filling operation cam means (11,12) which cooperate with each other to define linking path means (15), having a variable profile, for leading said punches into engagement with said driving cam (9), said filling operation cam means (11,12) being mechanically linked to each other for changing the variable profile of said linking path means (15) in accordance with any position of said driving cam (9).

2. The device according to claim 1, wherein said filling operation cam means (11,12) comprise an inner cam and an outer cam with respect to said vertical axis for engagement with respective rollers (8) rotatably supported by said punches (5,6), said inner cam (11) and said outer cam (12) cooperating with each other for defining said linking path means, said linking path means (15) being, in a form of a channel having a variable profile and leading to said driving cam (9).

3. The device according to claim 1, wherein said filling operation cam means (11,12) include an outer filling displacement cam (12) and an inner filling operation cam (11) with reference to said vertical axis, said outer filling displacement cam (12), being slidingly guided in a vertical direction with respect to the machine and said inner filling operation cam (11), being slidable angularly with respect to the machine, on a circular path concentric with said turret (1).

4. The device according to claim 3, wherein said outer filling displacement cam (12) includes a first section (12a) and a second section (12b), said first section (12a) being formed from a lower wall of said outer filling displacement cam (12) and inclined upwards, and said second section (12b), being forward from the same lower wall and being horizontal and straight, and two sections of an upper wall of said outer filling displacement cam (12) being horizontal and straight, but vertically staggered and linked to each other by an inclined section (12c) inclined upwards following in a direction of said turret as it rotates about said vertical axis, and said inclined sections determining a minimum difference of a level (h) for an axial translation of the punch.

5. The device according to claim 3, wherein said inner filling operation cam (11) includes a first section (11a) and a second section (11b), said first section (11a) being formed from an upper wall of said inner filling operation cam (11) and being horizontal and straight, and said second section (11b) being formed from the same upper wall and being inclined upwards, said inner filling operation cam (11) having a lower wall including two sections which are horizontal and straight, but vertically staggered and linked to each other by means of an inclined section (11c), for defining a minimum difference level (h) for the punches.

6. The device according to claim 3, comprising means including an inclined plane for mechanically linking said filling operation cam means (11,12) to each other for determining angular movement of said inner filling operation cam (11) responsive to vertical movement of said outer filling displacement operation cam (12).

7. The device according to claim 6, wherein said inclined plane is formed by a tooth (23), inclined upwards, and fastened to said inner filling operation cam (11) and extending longitudinally thereto, and aimed at engaging a groove (24) defined by said outer filling displacement cam (12) and extending upwards.

8. The device according to claim 1, wherein said filling operation cam means (11,12) lead to said driving cam (9) at a level over a lower guide wall of said driving cam (9), thus causing an additional displacement of the punch (5,6) with respect to a stroke defined by said driving cam (9) so as to increase feeding the die hole with material.

9. The device according to claim 1, wherein said driving cam (9) and said filling operation cam means (11,12) operate said upper punch (5).

10. The device according to claim 4, comprising means including an inclined plane for mechanically linking said filling operation cam means (11,12) to each other for determining angular movement of said inner filling operation cam (11) responsive to the vertical movement of said outer filling displacement cam (12).

11. The device according to claim 10, wherein said inclined plane is formed by a tooth (23), inclined upwards, fastened to the said inner filling operation cam (11) and extending longitudinally thereto, and aimed at engaging a groove (24) defined by said outer filling displacement cam (12) and extending upwards.

* * * * *